(12) United States Patent
Janjua et al.

(10) Patent No.: US 9,080,731 B2
(45) Date of Patent: Jul. 14, 2015

(54) LIGHTING HOUSING WITH LED ILLUMINATION INSERT

(71) Applicant: LUMINATOR HOLDING, LP, Plano, TX (US)

(72) Inventors: Adnan Janjua, Frisco, TX (US); Sheldon Rohde, Sachse, TX (US); John Barr, Garland, TX (US)

(73) Assignee: Luminator Holding, LP, Plano, TX (US)

( * ) Notice: Subject to any disclaimer, the term of this patent is extended or adjusted under 35 U.S.C. 154(b) by 65 days.

(21) Appl. No.: 14/071,303

(22) Filed: Nov. 4, 2013

(65) Prior Publication Data

US 2015/0124440 A1 May 7, 2015

(51) Int. Cl.
*F21K 99/00* (2010.01)
*F21S 8/10* (2006.01)
*B60Q 3/02* (2006.01)
*F21V 17/16* (2006.01)
*F21V 19/00* (2006.01)

(52) U.S. Cl.
CPC .............. *F21K 9/175* (2013.01); *B60Q 3/025* (2013.01); *B60Q 3/0246* (2013.01); *F21K 9/50* (2013.01); *F21K 9/90* (2013.01); *F21S 48/00* (2013.01); *F21V 17/164* (2013.01); *F21V 19/003* (2013.01); *F21V 19/004* (2013.01)

(58) Field of Classification Search
CPC ............ F21S 48/00; F21K 9/175; F21K 9/50; F21K 9/90; F21V 21/00; F21V 17/00; F21V 17/104; F21V 17/16; F21V 17/164; F21V 19/00; F21V 19/001; F21V 19/0015; F21V 19/003; F21V 19/004; B60Q 3/00; B60Q 3/0209; B60Q 3/0246; B60Q 3/04; B60Q 3/025; B60Q 3/0253; B60Q 3/0256
See application file for complete search history.

(56) References Cited

U.S. PATENT DOCUMENTS

| 8,319,433 | B2 | 11/2012 | Lin et al. | |
|---|---|---|---|---|
| 2003/0179574 | A1* | 9/2003 | Kuisma | 362/217 |
| 2014/0112014 | A1* | 4/2014 | Lin et al. | 362/520 |

* cited by examiner

*Primary Examiner* — Bao Q Truong
(74) *Attorney, Agent, or Firm* — Howison & Arnott, LLP (57) ABSTRACT

A LED assembly and method for retrofitting a fluorescent lighting fixture into an LED lighting fixture. The resulting retrofit LED lighting fixture includes the preexisting fluorescent lighting housing, a lens door, a sheet metal LED insert, and a modular LED printed wiring assembly.

18 Claims, 6 Drawing Sheets

LIGHTING HOUSING WITH LED ILLUMINATION INSERT

TECHNICAL FIELD

The following disclosure generally relates to lighting systems, and more particularly, to interior lighting systems used in transit vehicles or conveyances such as busses, rail cars, air planes, ocean vessels, and the like. Additionally the following disclosure relates to a retrofit LED illumination insert that may be used to replace a fluorescent tube in lighting fixtures.

BACKGROUND

Transit vehicles and similar conveyances typically rely on fluorescent light to provide illumination to the interior of the vehicles. This has been done because historically fluorescent lighting is more efficient than other available lighting such as incandescent lighting. However, fluorescent lighting has its own drawbacks and limitations.

For example, fluorescent bulbs have a relatively short lifespan and a high current draw when compared with newer lighting technologies, and in particular with light emitting diodes (LEDs). Fluorescent lighting is not very amenable to flexible control and can be difficult to dim or to provide color variations. For example, if a fluorescent lamp filament gets too cool when attempting to dim the lamp, the lamp may simply go out and not emit any light. If current continues to flow while the electrodes are at an improper temperature, then severe rapid degradation of the filament can occur. Additionally, fluorescent lamps can shatter and emit mercury gas during maintenance, which is undesirable.

Recently, attempts have been made to incorporate LED lights into transit vehicles, in order to overcome some of the drawbacks of fluorescent lighting systems and/or to obtain certain other benefits. Some of these attempts have involved retrofitting existing fluorescent lighting fixtures to utilize LEDs. Typically, this type of retrofitting is accomplished by replacing the fluorescent light tube with a tube-shaped LED fixture having a strip of LEDs surrounded by a translucent or transparent polycarbonate tube and fitting into the electrical pin connectors that formerly supplied power and physical support to the fluorescent light tube. While this technique may allow for the replacement of fluorescent light tubes with LEDs, it still has drawbacks. For example, the light quality of such fixtures may not be ideal. Also, despite attempts to mask them, the LEDs still generally appear as visible point light sources, which is undesirable.

What is needed is an LED retrofit and method for installing the LED retrofit into a preexisting fluorescent lighting fixture that is inexpensive, easy to install and produces lighting that does not generally appear as visible point sources of light within the fixture.

SUMMARY

Various embodiments provide a retrofit for a tube axial fluorescent lighting fixture into an LED lighting fixture. The resulting LED lighting fixture comprises three main elements being the lighting fixture housing, an LED retrofit insert and a lens door.

In one embodiment, an LED lighting fixture is provided. The LED lighting fixture has an elongate fixture housing. The elongate fixture housing has a rectangular base portion extending a predetermined length between a first side wall and a second side wall. The first side wall extends upward from the base portion. The second sidewall extends upward from the base portion and has an overhanging feature spaced from the base portion. The overhanging feature extends toward the first side wall. Within the interior of the fixture housing there is a groove having raised sides along the intersection of the rectangular base portion and the first side wall. The LED lighting fixture also includes an LED insert assembly. The LED insert assembly includes (1) an elongate thin metal portion—the elongate thin metal portion has a raised central mount surface extending along its length, the raised central mount surface bordered on opposing sides by a first vertical wall and a second vertical wall both extending downward from the raised central mount surface; (2) an angled flange that extends outward from the bottom of the first vertical wall; as well as (3) an angled edge lip that extends outward and downward from the outer edge of the angled flange, the angled edge lip being angled downward between about 10 and 30 degrees from a top surface of the angled flange, the angled edge lip being inserted in the groove. The elongate thin metal portion further includes (4) a tab flange extending outward from the bottom of the second vertical wall; (5) a plurality of locking tabs spaced along and extending upward from an outer edge of the tab flange, the locking tabs removably engaged with the overhanging feature; and (6) an LED printed wiring assembly (PWA) mounted on the raised central mount surface, the LED PWA includes a plurality of LEDs. The LED lighting fixture further includes a lens door including a translucent lens cover removably attachable to an output opening between the first side wall and the second side wall of the fixture housing.

In some embodiments of the LED lighting fixture the elongate fixture housing is extruded aluminum.

In some embodiments of the LED lighting fixture each of the locking tabs further include a joggled feature configured such that the joggled feature abuts the overhanging feature while a portion of the locking tab extends into a cavity area bounded by the overhanging feature, the second side wall and the base portion.

In some embodiments of the LED lighting fixture the lens door is configured to hingeably attach to the first side wall of the elongate fixture housing.

In some embodiments of the LED lighting fixture the raised central mount surface is substantially flat between the first vertical wall and the second vertical wall.

In some embodiments of the LED lighting fixture the angled flange extends outward and downward from the first vertical wall at an angle between about 90 and 135 degrees.

In some embodiments of the LED lighting fixture the tab flange extends outward from the bottom of the second vertical wall at substantially a 90 degree angle.

In some embodiments of the LED lighting fixture the LEDs are colored LEDs configured to be selectable RGB color variations.

In another embodiment, an LED insert for a lighting fixture housing is provided that includes an elongate thin contoured portion. The elongate thin contoured portion includes a raised central mount surface extending along its length. The raised central mount surface is bordered on opposing sides by a first vertical wall and a second vertical wall both extending downward from the raised central mount surface. An angled flange extends outward from the bottom of the first vertical wall. An angled edge lip extends outward and downward from the outer edge of the angled flange. The angled edge lip is angled downward between about 10 and 30 degrees from a top surface of the angled flange. The angled edge lip is further configured for insertion into a groove extending along the length of an interior side of an elongate lighting fixture. There is a tab flange that extends outward from the bottom of the second vertical wall. A plurality of locking tabs are spaced along and extend upward from an outer edge of the tab flange. The locking tabs are removably engaged with the overhanging feature. Additionally, a LED printed wiring assembly (PWA) is mounted on the raised central mount surface. The LED PWA has a plurality of LEDs.

In some embodiments, the LED insert's raised central mount surface is substantially flat between the first vertical wall and the second vertical wall.

In various embodiments, the LED insert's angled flange extends outward and downward from the first vertical wall at an angle between about 90 and 135 degrees.

In various embodiments, the LED insert's tab flange extends outward from the bottom of the second vertical wall at substantially a 90 degree angle.

In various embodiments, the insert's LEDs are colored LEDs configured to be selectable RGB color variations.

In another embodiment, an LED insert assembly for retrofitting a fluorescent lighting fixture is provided. The LED insert assembly includes an elongate assembly securably attachable within a fluorescent lighting fixture housing interior. The housing interior includes a base portion having a groove extending proximate to and along a first interior side wall of the housing interior and an overhanging feature extending inward from a second interior side. The overhanging feature is both substantially parallel to and spaced from the interior base. The second interior side wall is opposite to the first interior sidewall. The elongate assembly includes (1) an angled flange on a first side edge of the elongate assembly, the angled flange includes an angled edge lip configured to engage with the groove; (2) a tab flange on a second side edge of the elongate assembly, the tab flange has a plurality of locking tabs configured to engage the overhanging feature and provide a spring force to hold the angled edge lip in engagement with the groove and (3) an LED printed wiring assembly (PWA) having a plurality of LEDs disposed thereon. The LED printed wiring assembly is attached centrally along the length of the elongate assembly.

In some embodiments, the LED insert assembly includes a plurality of LED PWAs attached centrally along the length of the elongate assembly.

In some embodiments, the plurality of locking tabs on the LED insert assembly each comprise a joggle feature configured to engage the overhanging feature and provide a final seating position for the locking tabs.

In another embodiment, a method of retrofitting a fluorescent lighting fixture with a LED assembly is provided. The method includes a plurality of steps. These steps include (1) removing from the interior of the fixture housing the fluorescent tube, the fluorescent tube sockets, and the ballast; (2) positioning the LED assembly such that an angled tab lip along a first side of the LED assembly is inserted into a groove along a first side of and extending the length of the fixture housing; (3) rotating a second side of the LED assembly into the fixture housing with the groove acting as a pivot point; (4) pressing the second side of the LED assembly into the fixture such that a plurality of locking tabs on the second side of the LED assembly engage an overhanging feature on a second side of the fixture housing, the locking tabs include a joggle feature configured to provide a final seating position for the locking tabs. The overhanging feature extends inward from the second side of the fixture housing and is parallel to and spaced from a base portion of the interior of the fixture housing.

Additionally, a lens door can be put in place to cover the interior of the fixture housing prior to the removing step.

BRIEF DESCRIPTION OF THE DRAWINGS

For a more complete understanding, reference is now made to the following description taken in conjunction with the accompanying drawings in which.

DETAILED DESCRIPTION

Embodiments provide a light emitting diode (LED) module insert that is adapted to retrofit or change out fluorescent tube(s) within an axial fluorescent tube lighting fixture. The necessary fluorescent lighting fixture features, such as the fluorescent tube, the fluorescent tube sockets, the ballast and wiring terminal block are removed from the fluorescent lighting fixture and replaced with a metal structure comprising a plurality of spaced LEDs and a wiring assembly. The metal structure fits into the preexisting housing of the fluorescent lighting fixture housing by means of a plurality of interlocking tab features and an edge lip in groove feature. An advantage of an exemplary LED module insert is that an existing fluorescent lighting fixture can be upgraded or retrofitted without requiring any cutting, drilling or bending of the preexisting fluorescent lighting fixture in preparation for installation of an exemplary LED module insert.

Figure 1:
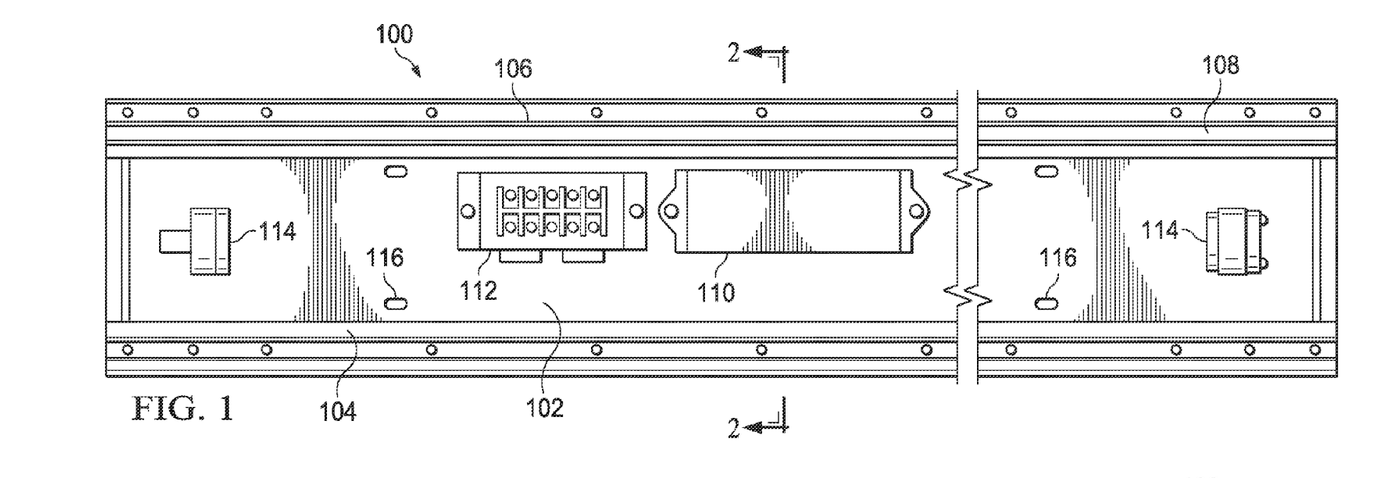
FIG. 1 illustrates a top or front view exemplary lighting fixture housing having fluorescent light elements installed.

FIG. 1 is a front view of a fluorescent lighting fixture housing 100. The fluorescent lighting fixture housing 100 is the portion of fluorescent lighting fixture to which a fluorescent tube (not specifically shown) is attached. A typical fluorescent lighting fixture may be found or installed in a passenger rail car, but may also be installed in aircraft, ocean vessels, transportation busses, other transportation vehicles, houses, warehouses, stadiums, shopping centers, and other structures where fluorescent lighting fixtures may be installed.

The fluorescent lighting fixture housing 100 may be made from extruded aluminum having a base portion 102 that is centrally located and extends the length of the fixture housing 100. The fixture housing 100 also has a first side 104 that may be referred to as the hinged side 104 and a second side 106 that comprises an overhanging feature 108. The overhanging feature 108 is a wall that is both substantially parallel to and spaced from the base portion 102 as described below. Exemplary fluorescent lighting fixture housings may come in various lengths, including for example 4, 5, 6 and 8 foot lengths.

Mounted inside the fixture housing 100 to the base portion 102 is a ballast 110 and a terminal block 112. Also, on the base portion 102 are a plurality of mounting slots 116 or holes that are configured for use with mounting the fluorescent fixture to, for example, an overhead surface using screws, bolts, nails, fasteners, rivets or other attachment or mounting means. A pair of fluorescent tube sockets 114 are positioned within the fixture housing 100 proximate to both ends of the base portion 102. The fluorescent tube sockets 114 are configured for attaching and electrically connecting both ends of an axial fluorescent tube (not specifically shown) to the lighting fixture housing 100.

Figure 2:
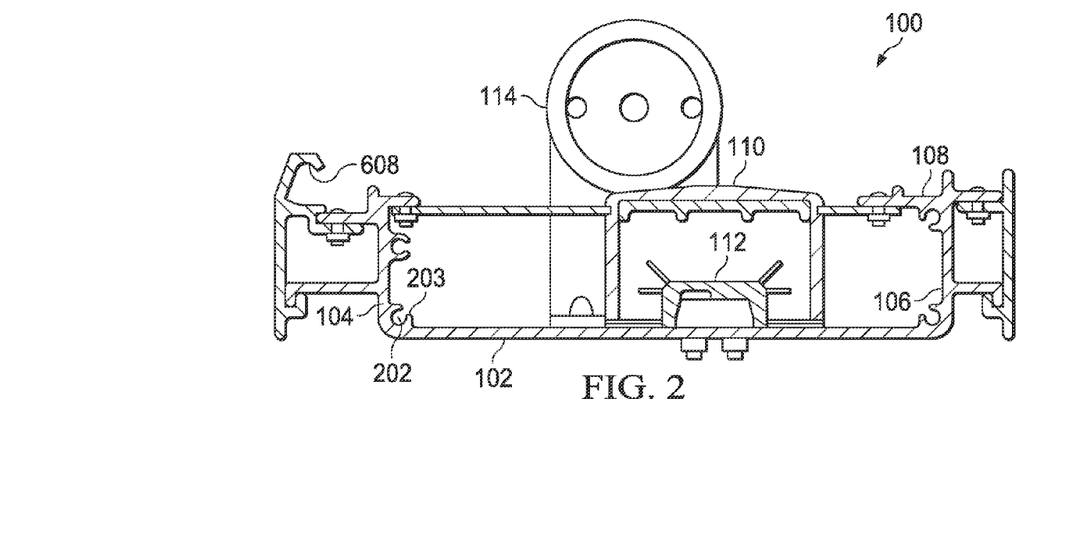
FIG. 2 illustrates a side cutaway view of the lighting fixture housing shown in FIG. 1.

FIG. 2 depicts a side view of the fixture housing 100. The side or end view depicts a cross section of the fixture housing 100, which has a general "C" shape. As one can see in FIG. 2, the fixture housing 100 has a base portion 102 to which the terminal block 112, the ballast 110 and the fluorescent tube sockets 114 are attached. The first side or hinged side 104 extends substantially perpendicular from the base portion 102. Within the housing interior of the fixture housing 100 where the first side 104 and the base section intersect is a groove 202 that extends the length of the first side 104. In some embodiments the groove 202 has raised sides or edges 203. On the opposing side of the fixture housing 100, the second side 106 extends substantially perpendicular from the base portion 102 to support and intersect with the overhanging feature 108. The overhanging feature extends from the intersection with the second side wall 106 toward the center of the fixture housing 100 and is substantially parallel with and spaced from the base portion 102.

To prepare the preexisting fluorescent lighting fixture to be upgraded or retrofitted with an embodiment of the invention several items are removed. The items that are removed are items that are necessary for the fluorescent aspect of the fixture. The items that are removed include the ballast 110, the terminal block 112 and the fluorescent tube sockets 114. These items can generally be removed without cutting, bending, creating additional holes or making any mechanical adjustments to any part of the fixture housing 100 prior to receiving an exemplary LED insert in accordance with various embodiments.

Figure 3:
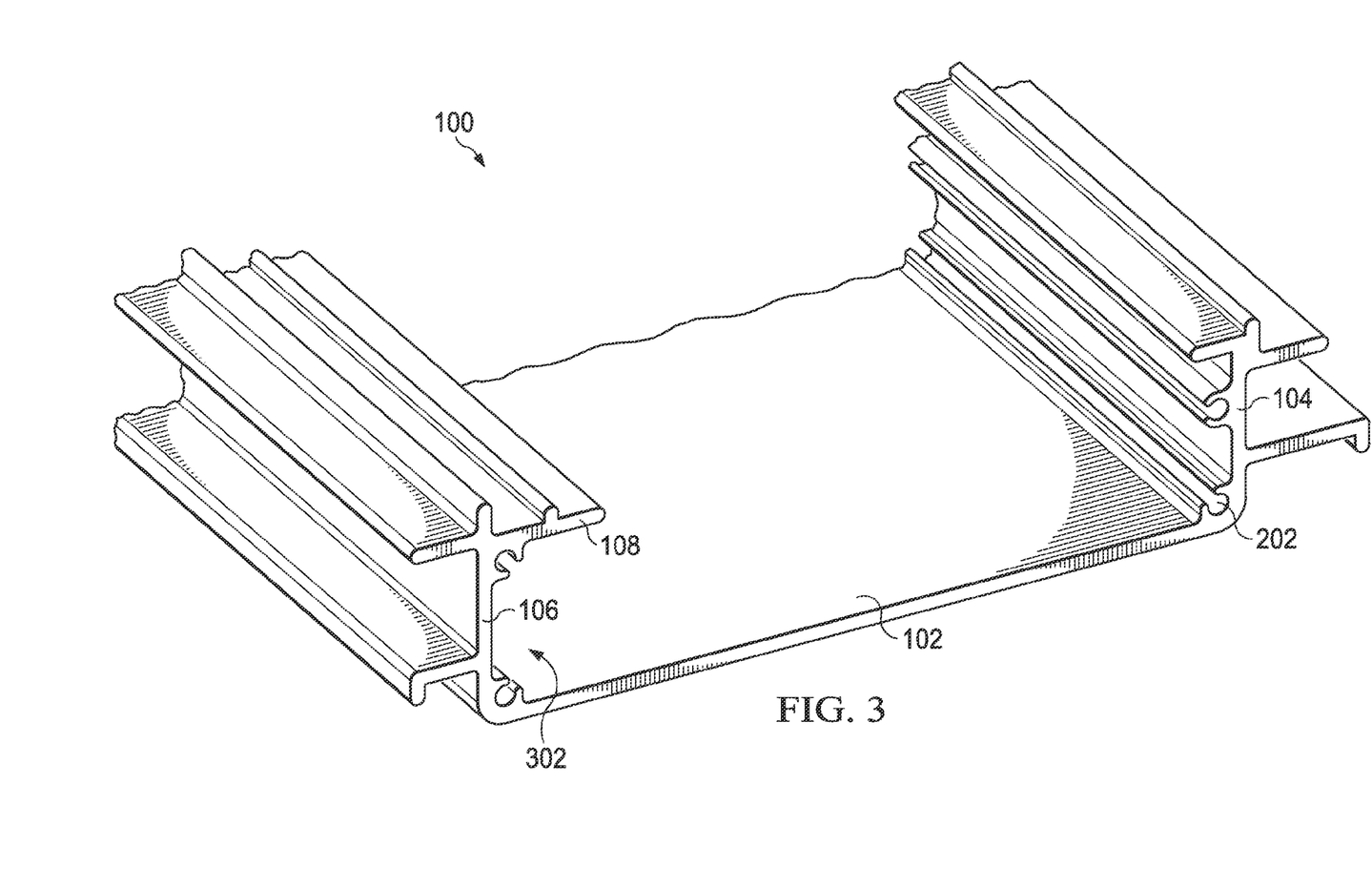
FIG. 3 illustrates a perspective view of an exemplary lighting fixture housing.

FIG. 3 is a side cutaway view of a substantial portion of the fluorescent lighting fixture housing 100 with the interior elements, being the ballast 110, the terminal block 112 and the fluorescent tube sockets 114 removed. It is easy to see the base portion 102, the first side 104, the groove 202, the second side 106 and the overhanging feature 108. The combination of the second side 106 and the overhanging feature 108 establish a cavity area 302 that extends the length of the second side 106 and base portion 102.

Figure 4:
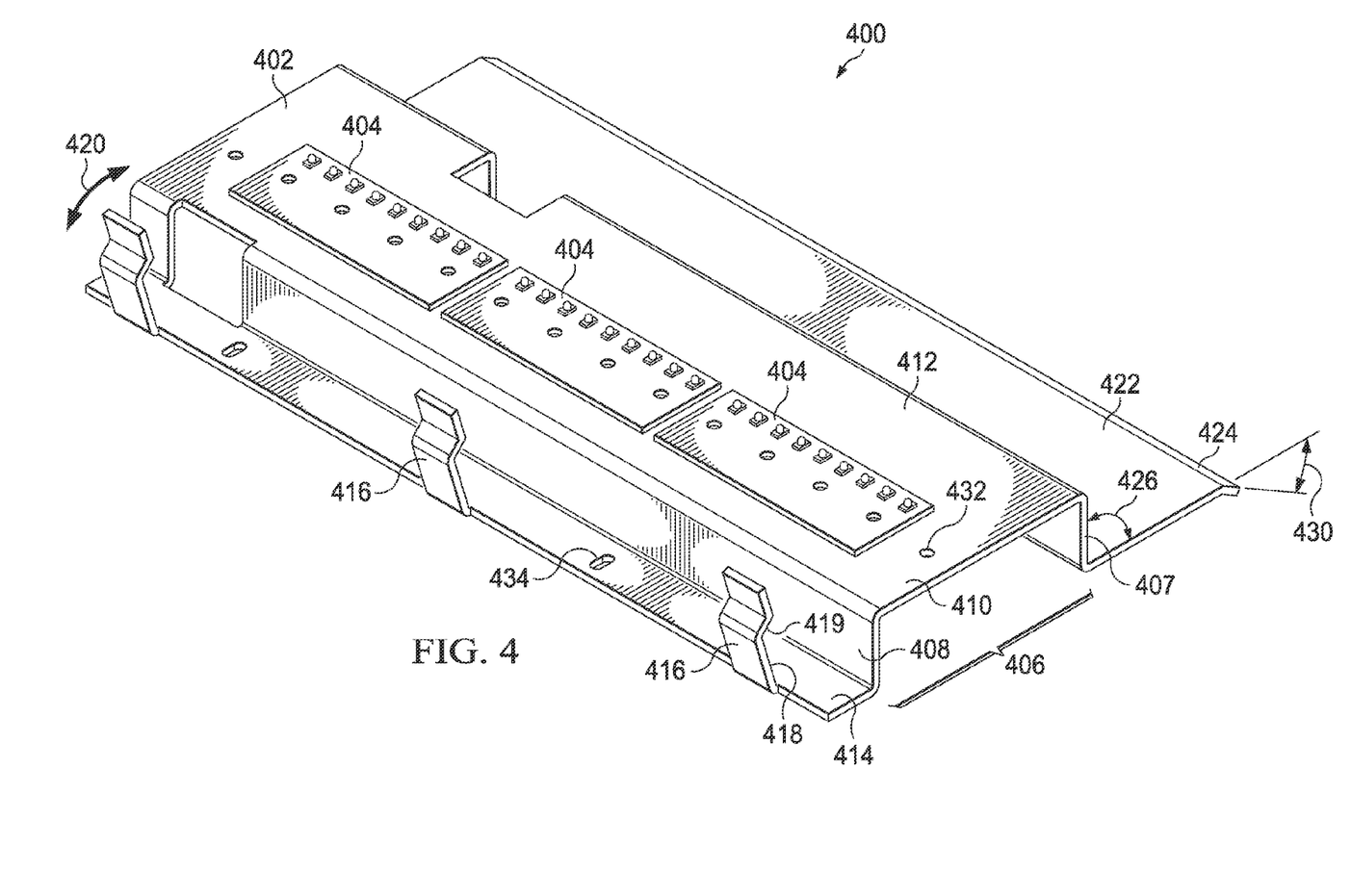
FIG. 4 illustrates a perspective view of an exemplary LED insert.

FIG. 4 is a depiction of an exemplary LED insert 400 in accordance with an embodiment of the invention. The LED insert 400 comprises a bent sheet metal portion 402 and a LED printed wiring assembly (PWA) 404. The bent sheet metal portion 402 can, in alternate embodiments, be constructed from an aluminum extrusion or be made of sheet or molded plastic. The bent sheet metal portion 402 has a cross section having a "hat section" 406 near its center. The hat section 406 comprises a first vertical wall 407 and a second vertical wall 408 joined by a top section 410. On the top side of the top section 410 is a LED printed wiring assembly (PWA) mount surface 412. Along the length of the second vertical wall 408 of the hat section 406 is a tab flange 414 that extends outward from the second vertical wall 408 at about a 90 degree angle. At spaced positions along the length of the tab flange 414 are locking tabs 416 configured to flexibly and removably seat within the cavity 302 formed within the overhanging portion 108, the second side 106 and the base portion 102 of the fixture housing 100 (see, FIG. 3). Each of the locking tabs 416 have a vertical portion 418 that extends substantially perpendicular to the tab flange 414 and comprises a joggle feature (i.e., jog right and then jog left) 419 configured to engage the overhanging feature 108 of the fixture housing 100 while the vertical portion 418 is within the cavity area 302. The locking tabs 416 are configured to flex toward and away (as shown by arrow 420) the hat section 406.

Along the length of the first vertical wall 407 of the hat section 406 is an angled flange 422, which extends at an angle 426 from the first vertical wall 407 that is greater than about 90 degrees and less then about 135 degrees. Along the edge of the angled flange 422 is an angled lip 424 extending outward at a downward angle 430 of between about 10 to 30 degrees with respect to the angled flange surface. The angled lip 424 is adapted to engage or fit into the groove 202 (see FIG. 3), which extends the length of the fixture housing 100. The angled lip 424 is angled to allow, during installation of the LED insert in to the fixture housing 100, insertion of the angled lip 424 in to the groove 202 and allow pivotal rotation of the entire LED insert 400 without any significant resistance, bending or flexing of the of hat section 406.

On the top surface of the top section 410, is the LED PWA mount surface 412. In various embodiments along the length of the LED PWA mount surface 412 there are a series of holes 432 extending through the metal 402. The holes are spaced to provide a mounting provision for one or more LED PWA devices 404.

Figure 5:
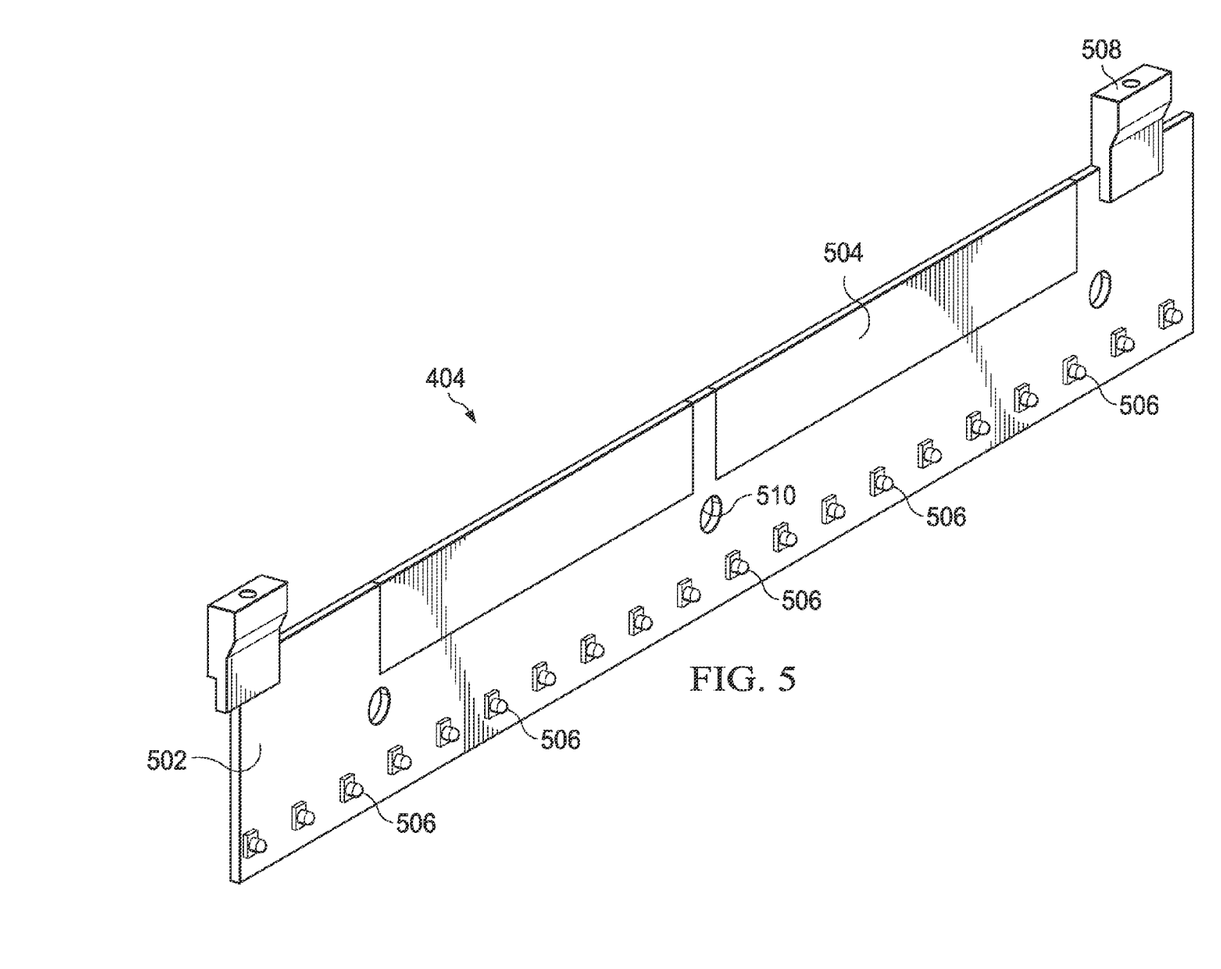
FIG. 5 illustrates an exemplary LED Printed Wiring Assembly (PWA)

In FIG. 5 a drawing of an LED PWA device 404 is depicted. In an embodiment, the LED PWA device 404 is about one foot long and comprises a printed circuit board 502 having circuitry 504 and 20 LEDs 506 spaced along the length of the LED PWA 404. In embodiments there may be power supply circuitry to convert input power provided to the LED PWA 404 to a correct voltage for the LEDs 506. The number of and spacing between the LEDs 506 can vary depending on the type of LED used and the amount lumens or type of lighting to be emitted from the retrofitted lighting fixture. A connector 508 is connected to each LED PWA 404 for receiving power and in some embodiments for linking or interconnecting a plurality of LED PWA devices together along the length of the LED PWA mount surface 412. As such a plurality of LED PWA devices 404 can be mounted on and connected in series along the LED PWA mount surface 412. In other embodiments the LED PWA devices may be connected in parallel. In various embodiments the LED PWA 404 may be of different lengths and widths.

To attach the LED PWA 404 to the LED PWA mount surface 412 there are spaced attachment holes 510 that align with the spaced holes 432. Blind rivets, push rivets, screws, nut & bolts or other attachment means (not specifically shown) can be used in the holes 432 to attach the LED PWA 404 to the mount surface 412. One of ordinary skill in the art can devise a number of additional ways to attach these two parts together so that they will stay together over time and not rattle or loosen due to vibrations or changes in temperature.

In one embodiment the LEDs 506 are surface mount ½ watt ultra-bright white LEDs. In other embodiments the LEDs may be of a larger or smaller wattage and/or be of different colors or provide RGB color variations to enhance the lighting effect or mood of the environment being lit by an exemplary fixture. In embodiments wherein the bent portion 402 of the LED insert 400 is metal, the metal acts as a heat sink to help remove or dissipate heat from the individual LEDs 506 while operating so as to prolong the working life span of each LED 506.

In other embodiments the circuitry 504 driving the LEDs 506 can be configured, upon receipt of an emergency signal or, to blink or flash in an organized sequential manner to indicate that there is an emergency and/or provide a directional sequence of flashing lights that provides a direction toward an exit or potential safety.

Referring to both FIGS. 3 and 4, the technique of installing or retrofitting a fluorescent lighting fixture housing 100 with an exemplary LED PWA 404 will be discussed. After the fluorescent items (e.g., ballast, terminal block, fluorescent tube sockets and fluorescent tube) have been removed from the fluorescent lighting fixture housing 100, the LED insert 400 is positioned with the hat section 406 facing up and the angled lip 424 is downward and aligned with the grove 202 of the fixture housing 100. The angled lip 424 is then inserted into the grove 202. The tab flange 414 side of the LED insert is then rotated and moved downward using the groove 202 as a pivot point for the movement into the fixture housing 100. The rotational and downward movement results in the vertical portion 418 of the locking tabs 416 moving into the housing and the locking tabs 416 engaging with the overhanging feature 108. This movement continues until the joggle feature 419 of the locking tabs 416 engage with the overhanging feature 108 and provide the final seating position of the tabs 416 within the cavity area 302 and against or engaged with the overhanging feature 108. In this embodiment the LED insert 400 is secured in the fixture housing 100 substantially securely without the use of any fasteners. The locking tabs provide a spring force that, when engaged with the overhanging feature 108, presses and holds the angled edge lip 424 in the groove 202. If the groove 202 has raised edges 203, the angled edge lip 424 may be held more securely in the groove 202.

In some embodiments where the fixture is installed in an environment that may encounter vibrations, such as in a rail car, a fastener (not specifically shown) is installed through one or more secondary fastening slots 434 located at spaced positions along the length of the tab flange 414. The fasteners (not specifically shown) can be rivets, blind rivets, screws, bolts or other fastening means that go through the secondary fastening slot and into or through the base portion 102 of the fixture housing 100. In some embodiments, the fasteners (not specifically shown) extend into the structure, wall, ceiling or shelf that the lighting fixture is being mounted on.

Figure 6:
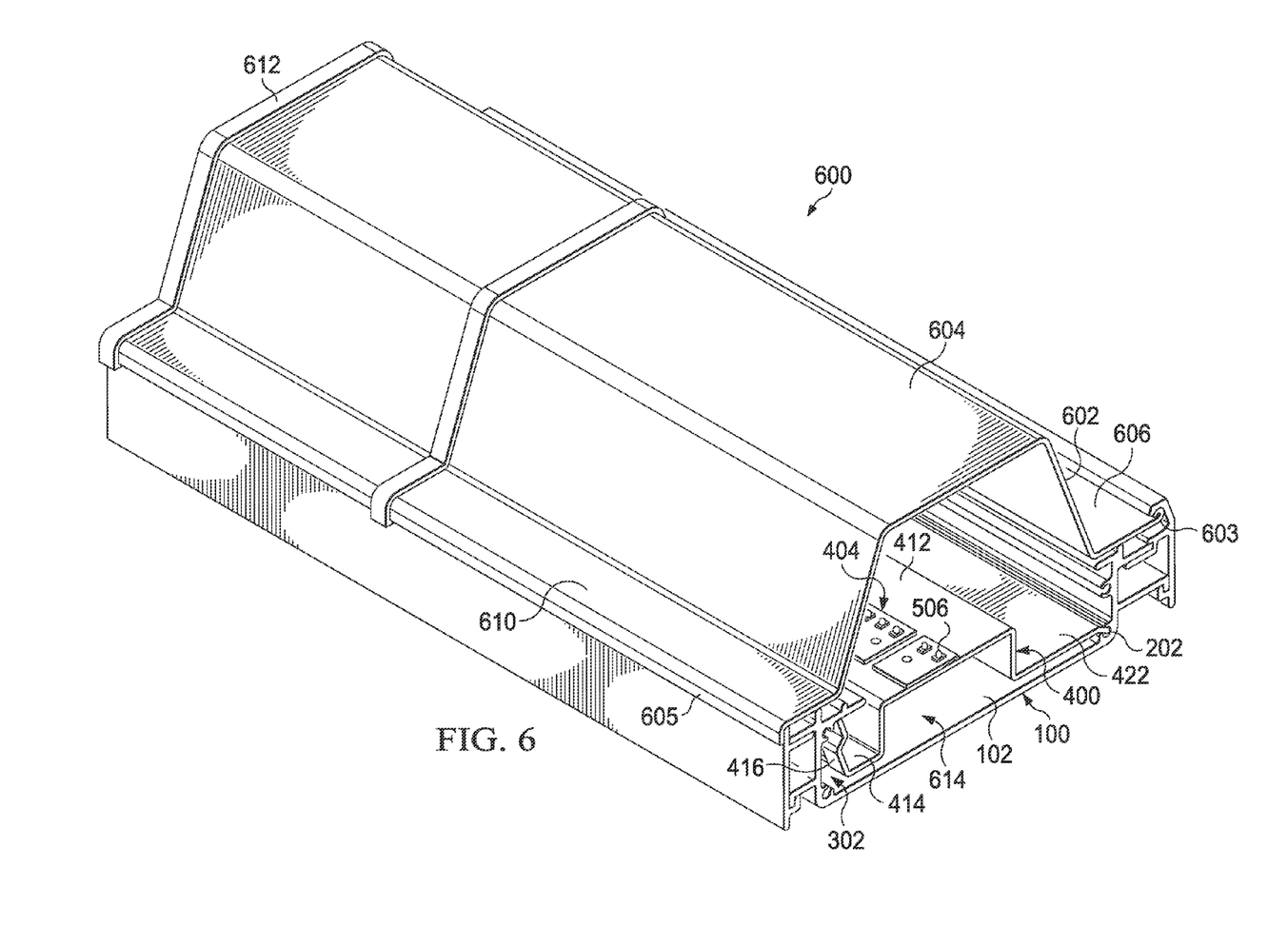
FIG. 6 illustrates an exemplary LED lighting fixture.

FIG. 6 is an overall view of an exemplary LED lighting fixture 600, which in some embodiments is a retrofit fluorescent lighting fixture. Here, the LED insert 400 is installed in the fixture housing 100. The angled edge lip 424 is engaged in the groove 202 and the locking tabs 416 have their joggled features engaged with the overhanging feature 108 holding the LED insert 400 substantially securely in place.

The LED lighting fixture 600 comprises basically three distinct portions. The first and second portions are the fixture housing 100 and LED insert 400. The third portion is a lens door 602. The lens door 602 is configured to removably attach to the fixture housing 100 and provide a translucent covering to disburse the light emitted from the plurality of LEDs 506. In some embodiments, the lens door 602 comprises a lens 604 that is an extruded long polycarbonate portion that covers the entire LED lighting surface. Along a first edge 606 of the lens door 602 is a first aluminum structure 603 configured to movably attach in a hinged fashion to a hinged feature 608 (see FIG. 1). Along a second edge 610 of the lens door 602 is a second aluminum structure 605 configured to removably attach to a top portion of the second side 104 of the fixture housing 100. At both ends of the lens door 602 are injection molded plastic end caps 612.

The LEDs 506 are spaced a predetermined distance from the lens 604 to enable light emitted from the LEDs 506 during operation to spread and refract through the lens surface so as to illuminate the space outside and around the front or lens side of the lighting fixture 600.

The base portion 102 and hat section 406 establish a wiring cavity or channel 614 for the purpose of providing room for power or signal wiring or cabling to enter the back or bottom side of the lighting fixture 600 and connect to one or more locations within the fixture, for example with the LED PWA connector(s) 508 or terminal blocks (not specifically shown).

Figure 7:
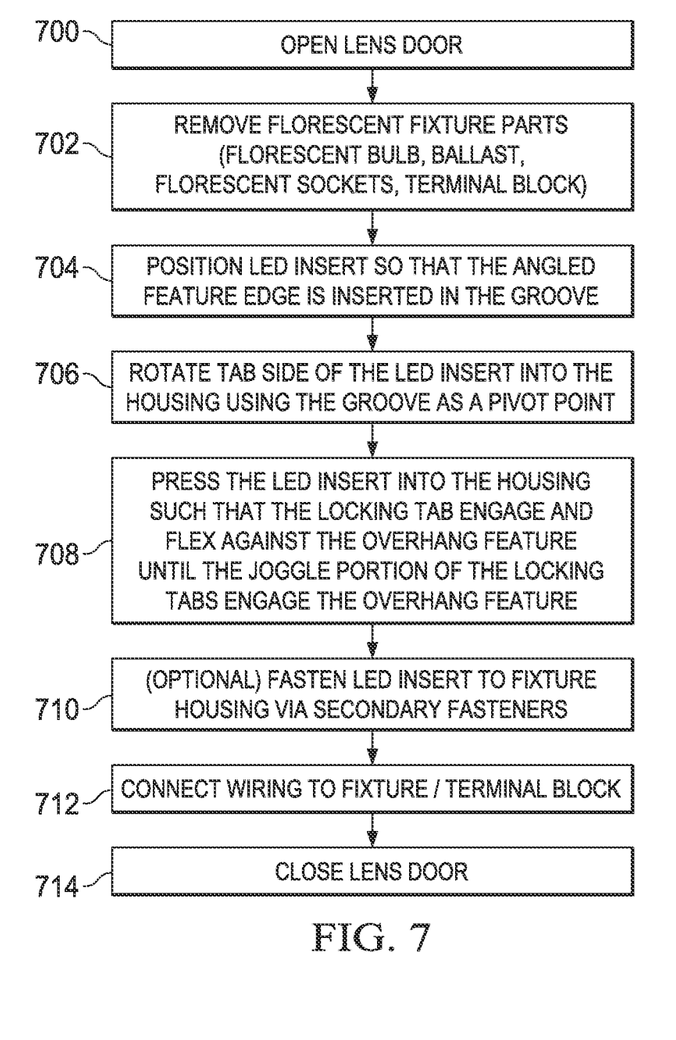
FIG. 7 is a flow chart showing an exemplary method of retrofitting a fluorescent lighting fixture.

FIG. 7 is a flow chart describing an exemplary method of retrofitting a fluorescent lighting fixture with an LED assembly. At step 700 the lens door of the lighting fixture is opened. In some embodiments there may not be a lens door per say, but instead a refraction lens cover that is removed from the lighting fixture. At step 702 the no longer needed fluorescent lighting fixture elements are removed from the lighting fixture. The elements that are removed comprise the fluorescent bulb, the ballast, the fluorescent bulb sockets, and in some embodiments a terminal block.

At step 704 the LED insert is positioned such that the angled edge lip 424 is inserted into the groove 202, which extends the length of an interior edge of the fixture housing 100. At step 706, the locking tab side of the LED insert is rotated into the fixture housing the groove/angled edge lip engagement as a pivot location. At step 708 the LED insert's locking tab side is pressed into the fixture housing such that the locking tabs 416 are bent slightly 420 as they engage the overhanging feature 108. As the joggled portion 419 of the locking tabs engage the overhanging feature 108, the locking tabs unbend at least slightly as the vertical portion of the locking tabs are within the cavity area 302 under the overhanging feature 108. The combination of the locking tabs 416 engaging the overhanging feature along and the angled edge lip feature engaging the groove secure the LED insert securely within the fixture housing.

At step 710 an optional step of fastening the LED insert to the fixture housing may be done by installing fasteners, such as screws, rivets or bolts through the secondary fastening slots 434 of the LED insert to strongly attach the LED insert to the fixture housing. This optional step 710 may be used when the fixture is installed in an environment that is subject to vibration so as to minimize rattling of the LED insert within the fixture housing.

At step 712, the wiring is connected to a terminal block within the lighting fixture or directly to connectors or terminals on the LED insert or LED PWA devices. As a final step 714, the lens door is closed or in alternative embodiments, the lighting fixture lens is installed on the fixture. In some retrofit situations, a different lens door or lighting fixture lens is installed with the LED retrofit than what existed with the fluorescent bulb so that the light produced by the LEDs is more smoothly refracted and spread as it emitted from the lighting fixture.

By using the exemplary LED insert, a retrofitting of a fluorescent lighting fixture is quickly and easily done without any additional bending or refabricating of the preexisting lighting fixture housing. Essentially, the fluorescent lighting fixture electrical elements are removed from the existing lighting fixture housing and an LED insert has one edge aligned and inserted into a groove extending along one inner side and the length of the fixture housing. Then the other side of the exemplary LED insert is pivoted and pressed into the housing such that its locking tabs flex and then engage with an overhanging feature that extends along the other interior side and the length of the fixture housing. Attach the wiring and cover the housing with a lens door or cover and the retrofit is complete.

Embodiments of the invention provide a retrofit for preexisting fluorescent lighting fixtures that uses significantly less power to produce a same amount of lumens. Additionally, embodiments require replacement or maintenance less often than fluorescent lighting because the mean time between failures for LED lighting devices is significantly longer than that of fluorescent lighting devices. Finally, during maintenance of exemplary lighting fixtures or exemplary retrofit lighting fixtures, there is no chance of exposure to broken shards of glass or mercury vapor due to fluorescent bulb breakage.

Although the preferred embodiment has been described in detail, it should be understood that various changes, substitutions and alterations can be made therein without departing from the spirit and scope of the invention as defined by the appended claims.

What is claimed is:

1. An LED lighting fixture comprising:
   an elongate fixture housing comprising:
      a rectangular base portion extending a predetermine length between a first side wall and a second side wall, the first side wall extending upward from the base portion; the second sidewall extending upward from the base portion and having an overhanging feature spaced from the base portion and extending toward the first side wall; and
      a groove having raised sides along the intersection of the rectangular base portion and the first side wall;
   an LED insert assembly comprising:
      an elongate thin metal portion comprising:
         a raised central mount surface extending along its length, the raised central mount surface bordered on opposing sides by a first vertical wall and a second vertical wall both extending downward from the raised central mount surface;
         an angled flange extends outward from the bottom of the first vertical wall;
         an angled edge lip extends outward and downward from the outer edge of the angled flange, the angled edge lip being angled downward between about 10 and 30 degrees from a top surface of the angled flange, the angled edge lip being inserted in the groove;
         a tab flange extends outward from the bottom of the second vertical wall;
         a plurality of locking tabs spaced along and extending upward from an outer edge of the tab flange, the locking tabs removably engaged with the overhanging feature; and
      an LED printed wiring assembly (PWA) mounted on the raised central mount surface, the LED PWA comprising a plurality of LEDs; and
      a lens door comprising a translucent lens cover removably attachable to an output opening between the first side wall and the second side wall of the fixture housing.

2. The LED lighting fixture of claim 1, wherein the elongate fixture housing is extruded aluminum.

3. The LED lighting fixture of claim 1, wherein each of the locking tabs further comprises a joggled feature configured such that the joggled feature abuts the overhanging feature and a portion of the locking tab extends into a cavity area bounded by the overhanging feature, the second side wall and the base portion.

4. The LED lighting fixture of claim 1, wherein the lens door is configured to hingeably attached to the first side wall of the elongate fixture housing.

5. The LED lighting fixture of claim 1, wherein the raised central mount surface is substantially flat between the first vertical wall and the second vertical wall.

6. The LED lighting fixture of claim 1, wherein the angled flange extends outward and downward from the first vertical wall at an angle between about 90 and 135 degrees.

7. The LED lighting fixture of claim 1, wherein the tab flange extends outward from the bottom of the second vertical wall at substantially a 90 degree angle.

8. The LED lighting fixture of claim 1, wherein the LEDs are colored LEDs configured to be selectable RGB color variations.

9. An LED insert for a lighting fixture housing, the LED insert comprising:
   an elongate thin contoured portion comprising:
      a raised central mount surface extending along its length, the raised central mount surface bordered on opposing sides by a first vertical wall and a second vertical wall both extending downward from the raised central mount surface;
      an angled flange extends outward from the bottom of the first vertical wall;
      an angled edge lip extends outward and downward from the outer edge of the angled flange, the angled edge lip being angled downward between about 10 and 30 degrees from a top surface of the angled flange, the angled edge lip being configured for insertion into a groove extending along the length of an interior side of an elongate lighting fixture;
      a tab flange extends outward from the bottom of the second vertical wall;
      a plurality of locking tabs spaced along and extending upward from an outer edge of the tab flange, the locking tabs removably engaged with the overhanging feature; and
   a LED printed wiring assembly (PWA) mounted on the raised central mount surface, the LED PWA comprising a plurality of LEDs.

10. The LED insert of claim 9, wherein the raised central mount surface is substantially flat between the first vertical wall and the second vertical wall.

11. The LED insert of claim 9, wherein the angled flange extends outward and downward from the first vertical wall at an angle between about 90 and 135 degrees.

12. The LED insert of claim 9, wherein the tab flange extends outward from the bottom of the second vertical wall at substantially a 90 degree angle.

13. The LED insert of claim 9, wherein the LEDs are colored LED configured to be selectable RGB color variations.

14. An LED insert assembly for retrofitting a fluorescent lighting fixture, the LED insert assembly comprising:
   an elongate assembly securably attachable within a fluorescent lighting fixture housing interior, the housing interior comprising base portion having a groove extending proximate to and along a first interior side wall of the housing interior and an overhanging feature extending inward from a second interior side, the overhanging feature is both substantially parallel to and spaced from the interior base, the second interior side wall is opposite to the first interior sidewall, the elongate assembly comprising:
      an angled flange on a first side edge of the elongate assembly, the angled flange comprising an angled edge lip configured to engage with the groove; and
      a tab flange on a second side edge of the elongate assembly, the tab flange comprising a plurality of locking tabs configured to engage the overhanging feature and provide a spring force to hold the angled edge lip in engagement with the groove;

an LED printed wiring assembly (PWA) having a plurality of LEDs disposed thereon, the LED printed wiring assembly attached centrally along the length of the elongate assembly.

15. The LED insert assembly of claim 14, further comprising a plurality of LED PWAs attached centrally along the length of the elongate assembly.

16. The LED insert assembly of claim 14, wherein each of the plurality of locking tabs comprises a joggle feature configured to engage the overhanging feature and provide a final seating position for the locking tabs.

17. A method of retrofitting a fluorescent lighting fixture with a LED assembly, the method comprising:

removing from the interior of the fixture housing the fluorescent tube, the fluorescent tube sockets, and the ballast;

positioning the LED assembly such that an angled tab lip along a first side of the LED assembly is inserted into a groove along a first side of and extending the length of the fixture housing;

rotating a second side of the LED assembly into the fixture housing with the groove acting as a pivot point;

pressing the second side of the LED assembly into the fixture such that a plurality of locking tabs on the second side of the LED assembly engage an overhanging feature on a second side of the fixture housing, the locking tabs comprising a joggle feature configured to provide a final seating position for the locking tabs, the overhanging feature extending inward from the second side of the fixture housing, the overhanging feature further being parallel to and spaced from a base portion of the interior of the fixture housing.

18. The method of claim 17, further comprising opening a lens door that covers the interior of the fixture housing prior to the removing step.

* * * * *